United States Patent
Wyler

(10) Patent No.: US 10,666,352 B2
(45) Date of Patent: May 26, 2020

(54) SATELLITE SYSTEM COMPRISING SATELLITES IN LEO AND OTHER ORBITS

(71) Applicant: WorldVu Satellites Limited, St Helier (JE)

(72) Inventor: Gregory Thane Wyler, Sewalls Point, FL (US)

(73) Assignee: WORLDVU SATELLITES LIMITED, St Helier (JE)

( * ) Notice: Subject to any disclaimer, the term of this patent is extended or adjusted under 35 U.S.C. 154(b) by 0 days.

(21) Appl. No.: 15/466,711

(22) Filed: Mar. 22, 2017

(65) Prior Publication Data

US 2018/0062737 A1 Mar. 1, 2018

Related U.S. Application Data

(60) Provisional application No. 62/449,441, filed on Jan. 23, 2017, provisional application No. 62/381,284, filed on Aug. 30, 2016.

(51) Int. Cl.
*H04B 7/00* (2006.01)
*H04B 7/185* (2006.01)
*H04B 7/195* (2006.01)
*H04B 7/19* (2006.01)

(52) U.S. Cl.
CPC ....... *H04B 7/18584* (2013.01); *H04B 7/1851* (2013.01); *H04B 7/18521* (2013.01); *H04B 7/19* (2013.01); *H04B 7/195* (2013.01)

(58) Field of Classification Search
None
See application file for complete search history.

(56) References Cited

U.S. PATENT DOCUMENTS

| | | | | | |
|---|---|---|---|---|---|
| 5,887,257 | A | * | 3/1999 | Olds | H04B 7/195 455/12.1 |
| 6,078,810 | A | * | 6/2000 | Olds | H04B 7/195 455/12.1 |
| 6,088,571 | A | * | 7/2000 | Kane | H04B 7/195 455/12.1 |
| 6,167,028 | A | * | 12/2000 | Harris | H04Q 11/0478 370/230 |
| 6,173,156 | B1 | * | 1/2001 | Worger | H04B 7/18584 455/12.1 |

(Continued)

FOREIGN PATENT DOCUMENTS

EP 1244230 A2 * 9/2002 ............... H04B 7/19

OTHER PUBLICATIONS

Officer Y. Akhertouz Moreno, "International Search Report and the Written Opinion", Related International Patent Application PCT/US2017/028573, dated Jul. 20, 2017, 9 pp.

*Primary Examiner* — Kwang B Yao
*Assistant Examiner* — Juvena W Loo
(74) *Attorney, Agent, or Firm* — Sughrue Mion, PLLC

(57) ABSTRACT

A satellite communications system comprising satellites in low earth orbit (LEO) as well as one or more satellites in orbits other than LEO, such as satellites in medium earth orbit (MEO) and/or satellites in geostationary orbit (GEO). The system routes data packets, such as may be received from the Internet, to either the LEO satellites or non-LEO satellites in accordance with routing logic. In some embodiments, the routing logic is based on the latency of the communications.

6 Claims, 13 Drawing Sheets

(56) References Cited

U.S. PATENT DOCUMENTS

| | | | | |
|---|---|---|---|---|
| 6,208,625 | B1* | 3/2001 | Zancho | H04B 7/18589 |
| | | | | 370/316 |
| 6,591,084 | B1* | 7/2003 | Chuprun | G06K 13/0825 |
| | | | | 455/3.05 |
| 6,684,056 | B1* | 1/2004 | Emmons, Jr. | H04B 7/19 |
| | | | | 455/12.1 |
| 8,010,127 | B2* | 8/2011 | Burtner | G01S 19/09 |
| | | | | 455/428 |
| 2002/0031103 | A1* | 3/2002 | Wiedeman | H04B 7/18584 |
| | | | | 370/316 |
| 2002/0137509 | A1* | 9/2002 | Laufer | H04B 7/19 |
| | | | | 455/427 |
| 2004/0211864 | A1* | 10/2004 | Less | H04B 7/195 |
| | | | | 244/158.4 |
| 2007/0281611 | A1* | 12/2007 | Monte | H04B 7/18563 |
| | | | | 455/13.2 |
| 2008/0062039 | A1* | 3/2008 | Cohen | G01S 19/05 |
| | | | | 342/357.29 |
| 2013/0051360 | A1* | 2/2013 | Monte | H04B 7/195 |
| | | | | 370/330 |
| 2016/0204853 | A1* | 7/2016 | Anders | H04B 7/18584 |
| | | | | 370/316 |
| 2017/0093482 | A1* | 3/2017 | Keshet | H04B 7/18513 |

\* cited by examiner

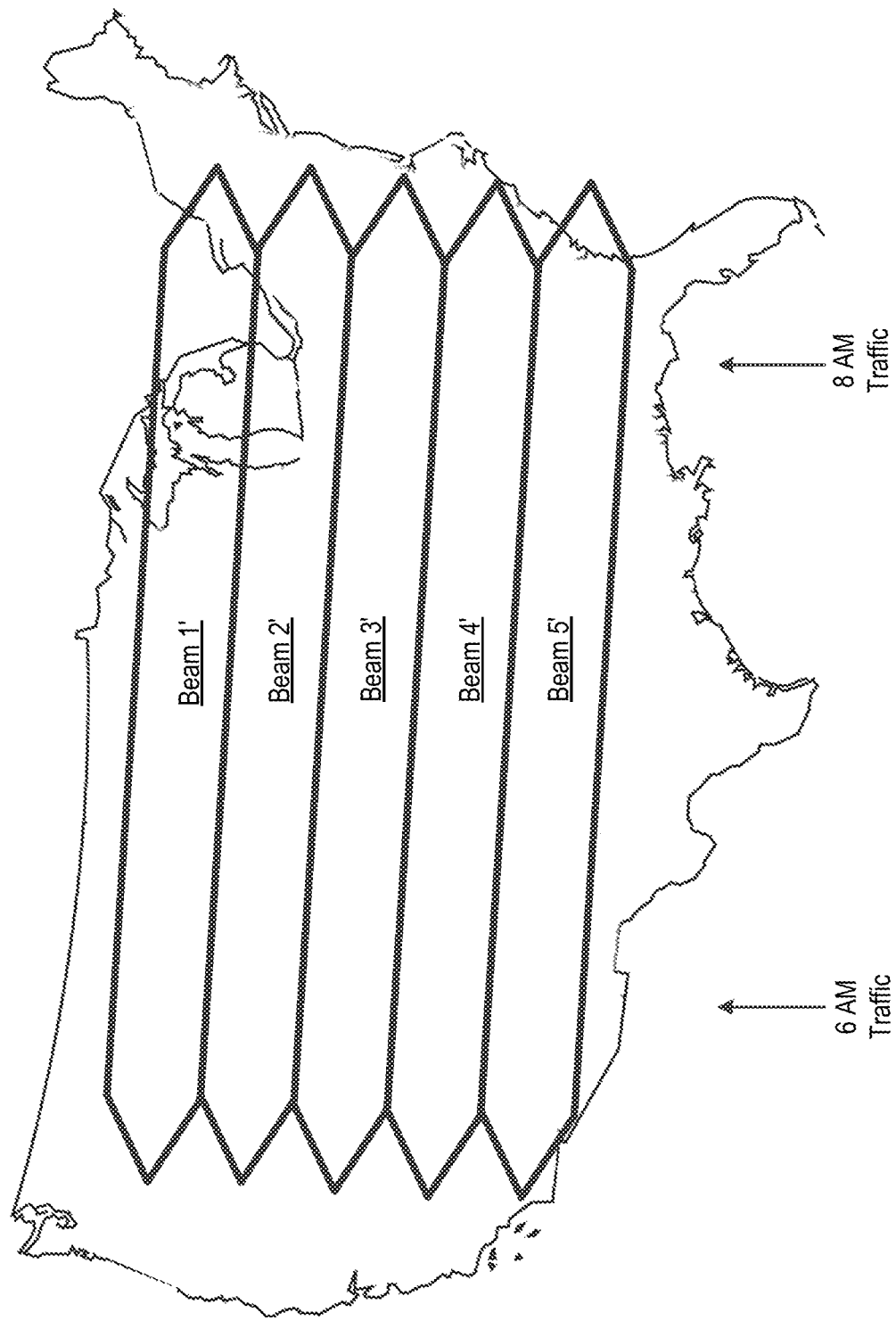

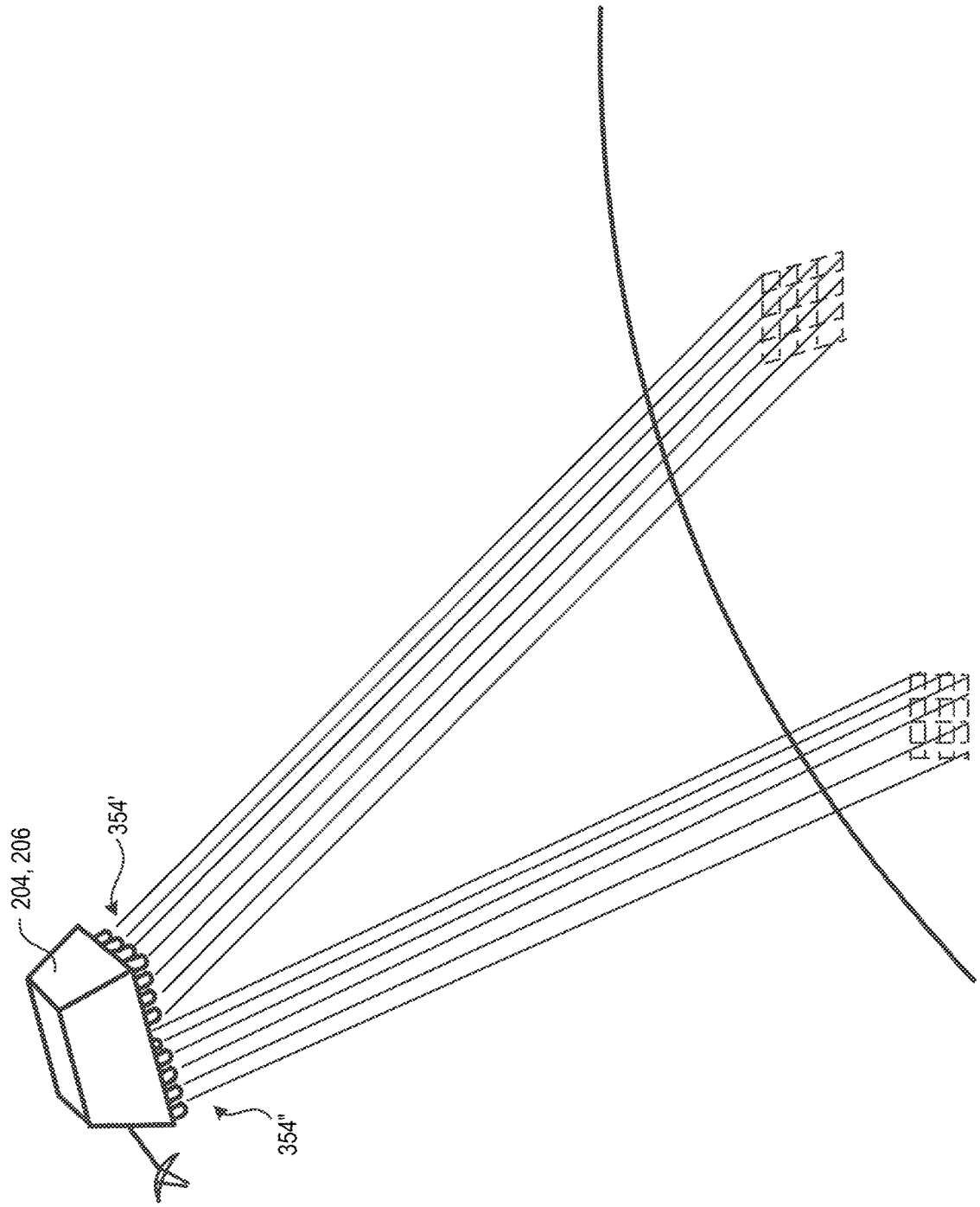

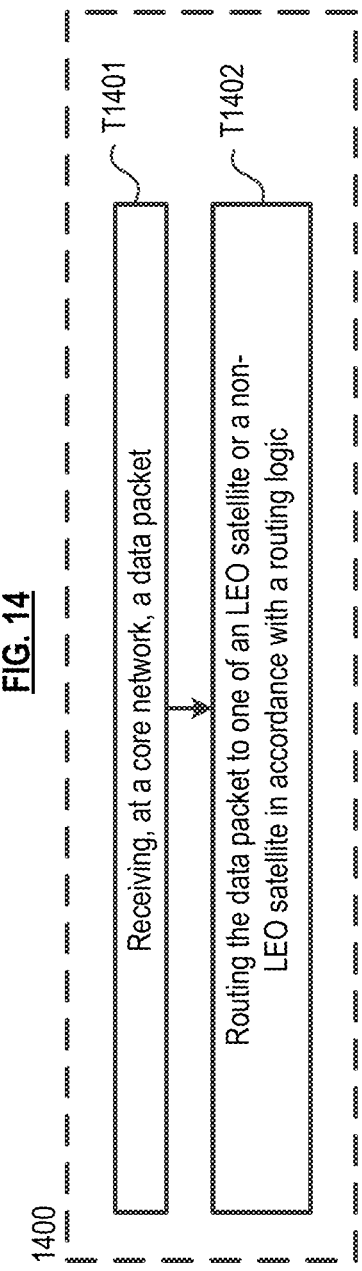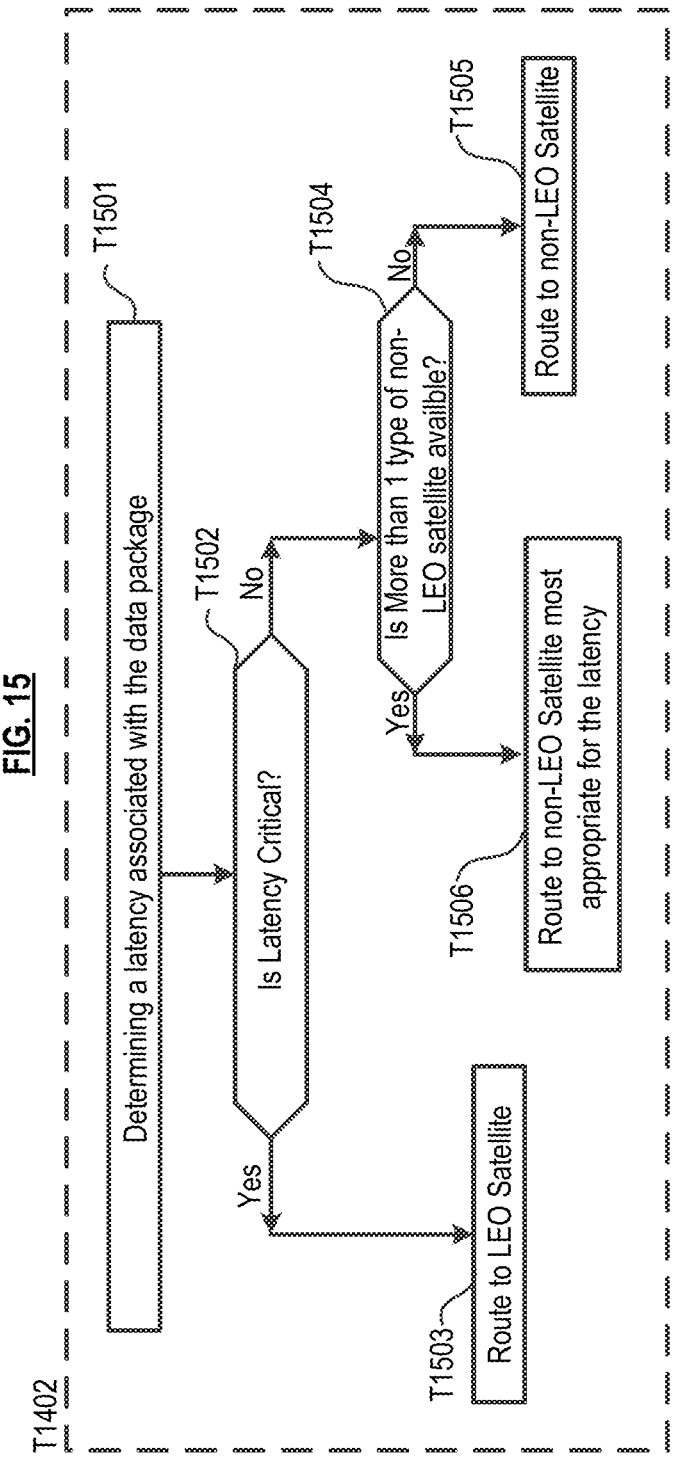

SATELLITE SYSTEM COMPRISING SATELLITES IN LEO AND OTHER ORBITS

STATEMENT OF RELATED CASES

This case claims priority of U.S. Pat. Applications Ser. No. 62/381,284 filed Aug. 30, 2016 and Ser. No. 62/449,441 filed Jan. 23, 2017, both of which are incorporated herein by reference.

FIELD OF THE INVENTION

The present disclosure relates to satellite communications systems.

BACKGROUND

Satellite systems for bringing low-cost broadband internet service to any location on the earth are currently being developed. Such systems typically include gateway antennas that link the internet to a fleet of non-geostationary satellites—in particular, low earth orbit (LEO) satellites—which in turn link to inexpensive user terminals positioned on the earth. The user terminals deliver internet connectivity to residences and businesses.

The satellites in the aforementioned systems cannot go above certain broadcast transmission power limits, which are determined by rules mandating non-interference with geostationary satellites as well as upper limits on satellite mass. As a consequence, demand is expected to easily outstrip capacity, even in areas of moderate population density.

SUMMARY

The present invention provides a way to increase the capacity of a non-geostationary satellite system. The illustrative embodiment of the present invention is a satellite system having one or more satellites in LEO and one or more satellites in orbits other than LEO, such as medium earth orbit (MEO), geostationary orbit (GEO), and/or alternative orbits (e.g., highly elliptical orbit (HEO), etc.).

In some embodiments, the other-than-LEO satellites are "one-way" only; namely forward link only (i.e., ground station/gateway antenna->satellite->user). In the illustrative embodiment, the one or more LEO satellites provide two-way operation; that is, both the forward link and the reverse link (i.e., user->satellite->ground station).

In the illustrative embodiment, the system includes a constellation of LEO satellites and one or more non-LEO satellites. In some embodiments, the non-LEO satellites comprise one or more constellations thereof.

In the illustrative embodiment, a routing logic determines which particular type of satellite in the satellite system handles any given data packet for the forward link; only LEO satellites handle the reverse link. In some other embodiments, as a function of orbit and/or routing logic, some types of non-LEO satellites handle the reverse link, as well. In such embodiments, routing logic is used for both the forward and reverse links, and the same routing logic, or a different logic, can be used.

In accordance with the illustrative embodiment, the routing logic is based on latency considerations; for example, the degree to which delays in the receipt of data packets affects a user's experience. For some services, low latency is desired/expected/required, providing a real-time characteristic with human-unnoticeable delays between an input being processed and the corresponding output. A few non-limiting examples of low-latency services include Voice-over-Internet-Protocol (VoIP), video conferencing, trading, and online gaming. For some other services, high latency is acceptable, wherein delays are noticeable but not problematic. Examples of high latency services include, without limitation, e-mail and peer-to-peer file transfers.

The causes of latency (e.g., propagation delay, serialization, data protocols, routing and switching, queing and buffing, etc.) are well understood. In the context of satellite communications, where there is a very great distance between ground stations and satellites, propagation delay is often the primary cause of latency.

Thus, in accordance with the illustrative embodiment, a routing logic based on latency will consider the distance between a ground station and a satellite; that is, the particular orbit of the satellite. Traffic that is unaffected by latency can be routed, for example, through a relatively more distant satellite, such as a geostationary satellite. Low-latency traffic should be routed through a satellite that is relatively close to the Earth, such as an LEO satellite. The MEO satellites are closer to the Earth than GEO satellites and so enable an enhanced ability to address latency issues (beyond simply "low" latency and "high" latency). For example, MEO satellites can handle medium latency loads, such as "chat room" applications. Additionally, MEO satellites can be placed in inclined or elliptical orbits, allowing coverage of high latitude/polar regions that are hard to cover with GEO satellites.

The same rationale applies to satellites in orbits other than GEO and MEO, as a function of their distance with respect to the Earth. In the case of a HEO satellite, there are certain times (i.e., at or near perigee) when the satellite is suitable for handling low latency traffic, and other times (i.e., at or near apogee) when the satellite will be suitable for handling only high latency traffic.

A satellite system having a constellation of LEO satellites and at least one satellite in an orbit other than LEO, wherein the other-than-LEO satellites are forward link only, results in a lower-cost, better-performing satellite system. Among any other reasons for this is that each type of satellite is handling tasks for which they are best suited. For example, in the context of a routing logic based on latency, LEO satellites provide low-latency service, MEO satellites provide medium-latency service, and geostationary satellites provide persistent regional coverage from a single platform, albeit with much longer latency times.

In some other embodiments, the routing logic is based on other considerations, as appropriate. For example, and without limitation, in some embodiments, the system routes through satellites based on:

(a) latency; or
(b) conjunction; or
(c) frequency availability; or
(d) security; or
(e) any other relevant considerations; or
(f) two or more of (a) through (e), using any relevant basis for prioritizing the two or more routing logics selected; and
(g) at least one of (a) through (e) after all routing logic (a) through (e) is considered.

In some embodiments, a satellite system in accordance with the invention comprises: a first constellation of satellites in low earth orbit (LEO); a second constellation of satellites in a non-LEO; and a core network, wherein the core network routes first data packets, wherein each first data packet is routed to one of either a satellite in the first constellation or a satellite in the second constellation in accordance with a first routing logic.

In some embodiments, a satellite system in accordance with the invention comprises: a first constellation of satellites in low earth orbit (LEO), wherein the satellites in the first constellation are two-way satellites; one or more satellites in non-LEO, wherein the one or more satellite in non-LEO are one-way, forward-link satellites; a core network, wherein the core network receives first data packets from and transmits second data packets to the Internet; and a user terminal, wherein the user terminal routes the second data packets to a satellite in the first constellation.

In some embodiments, a method in accordance with the invention comprises: receiving, at a core network, a first data packet; and routing, in accordance with a routing logic, the first data packet from the core network to one of a first satellite in low earth orbit (LEO) or a second satellite in an orbit other than LEO.

In some embodiments of the method, the method further comprises: determining a latency associated with the first data packet; and when the latency is low, routing the first data packet to the first satellite. In some embodiments of the method, the method further comprises: determining a latency associated with the first data packet; and when the latency is not critical, routing the first data packet to the second satellite.

The aforementioned embodiments of a satellite system and methods, as well as additional embodiments thereof, are disclosed below and depicted in the accompanying drawings.

BRIEF DESCRIPTION OF THE DRAWINGS

FIG. 10 depicts an embodiment of capacity load shifting.

FIG. 11 depicts multiple payload modules on the same GEO satellite to cover separate regions of the Earth.

FIG. 14 depicts a method in accordance with an illustrative embodiment of the present invention.

FIG. 15 depicts sub-tasks of an embodiment of the method of FIG. 14.

DETAILED DESCRIPTION

The following definitions are to be used in this disclosure and the appended claims:

"constellation" is a group of artificial satellites operating together under shared control.

"uplink" is a communications link from a ground location (e.g., a gateway, a user terminal, etc.) to a satellite.

"downlink" is a communications link from a satellite to a ground location.

"forward link" means a communications link from a ground station (e.g., gateway) to a user. It consists of both an uplink (ground station to satellite) and a downlink (satellite to a user).

"reverse link" or "return channel" means a communications link from a user to a ground station. Like a forward link, it includes both an uplink and a downlink.

"one-way satellite" means a satellite that is used for the forward link only.

"two-way satellite" means a satellite that is used for both the forward link and the reverse link.

"LEO satellite" or "MEO satellite" or "GEO satellite" refers to a satellite in that particular orbit. There is not necessarily a difference in the satellite, other than the orbit in which it resides. Reference to a "type" of satellite refers to the particular orbit in which the satellite resides.

"low latency" or "critical latency" means, in the context of a service, one in which a real-time characteristic is ideally required, such that any delays between an input being processed and the corresponding output are not noticeable to a human. A few non-limiting examples of low-latency services include Voice-over-Internet-Protocol (VoIP), video conferencing, trading, and online gaming. The response time for a low-latency service is typically less than about 0.05 seconds.

"high latency" means, in the context of a service, one that is insensitive to latency, such that there is no expectation or need to provide a real-time characteristic to the input/output exchange. Examples of high-latency services include, without limitation, e-mail and peer-to-peer file transfers. The response time for a high-latency service will typically exceed about 0.25 seconds.

"medium latency" means, in the context of a service, one that is less sensitive latency concerns than a low-latency service, but one in which high latency is undesirable. An example of a medium-latency service is a "chat room" application. The response time for a medium-latency service will typically be in the range of 0.05 to about 0.25 seconds.

"non-critical latency" means, in the context of a service, medium latency or high latency.

"latency associated with a data packet" means that the data packet assumes the latency of the particular service to which the data packet pertains. For example, if the data packet is data relevant to an online gaming session, the latency associated with the data packet is "low" or "critical," since online gaming is a low/critical latency application.

Figure 1:
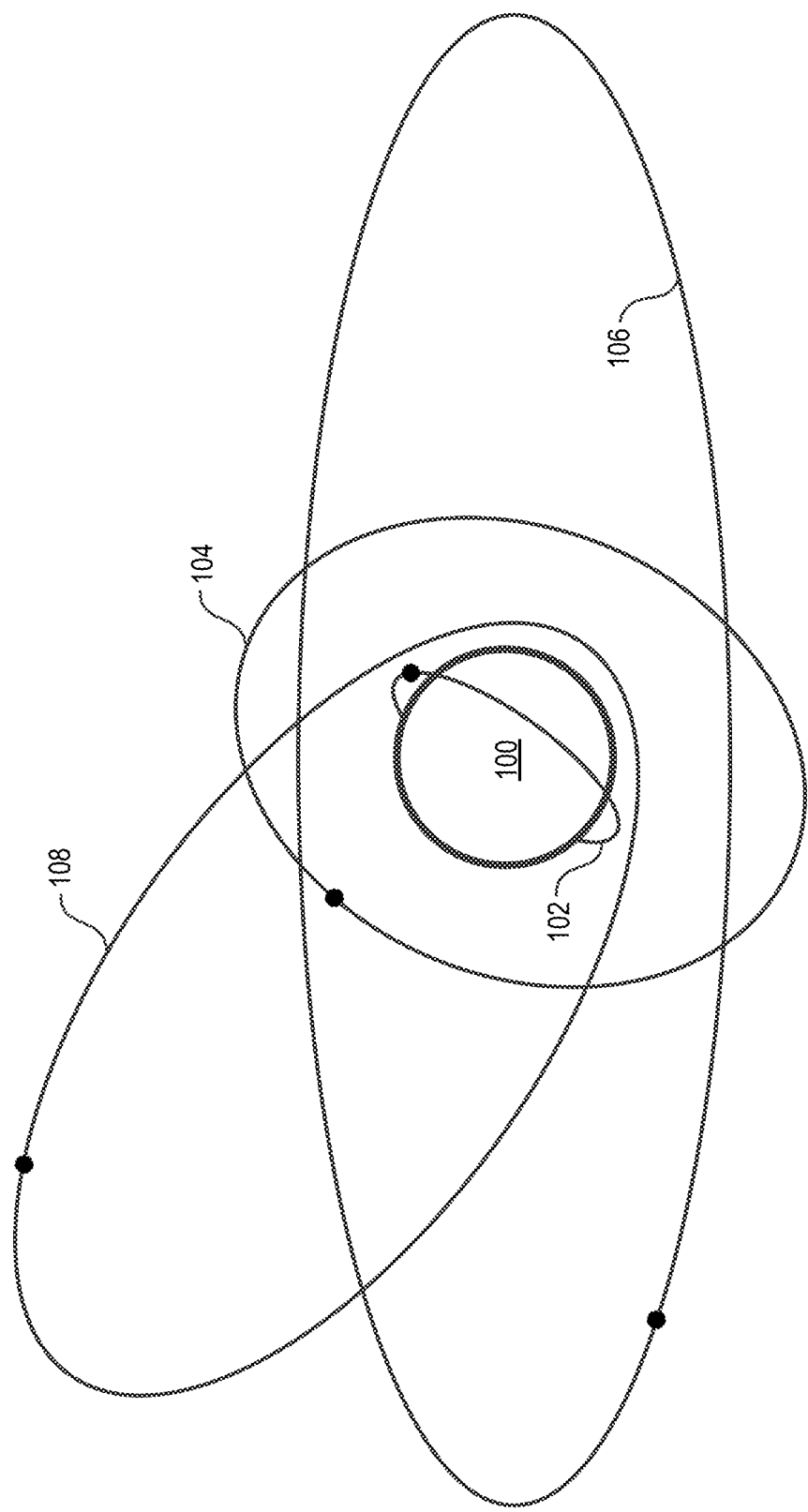
FIG. 1 depicts satellites in LEO, MEO, GEO, and HEO.

FIG. 1 depicts satellites orbiting Earth 100 in four different orbits, including a satellite in LEO 102, a satellite in MEO 104, a satellite in GEO 106, and a satellite in HEO 108. Although definitions vary a bit, LEO 102 is a geocentric orbit ranging in altitude from about 180 to about 2000 kilometers (km). MEO 104 is a geocentric orbit ranging in altitude from about 2000 to 35,786 km. A MEO orbit is also known as an "intermediate circular orbit." GEO 106 is a geocentric orbit with an altitude of 35,786 km. HEO 108 is an elliptic orbit with a low-altitude perigee (often less than 1000 km) and a high-altitude apogee (often over 35,786 km).

Figure 2:
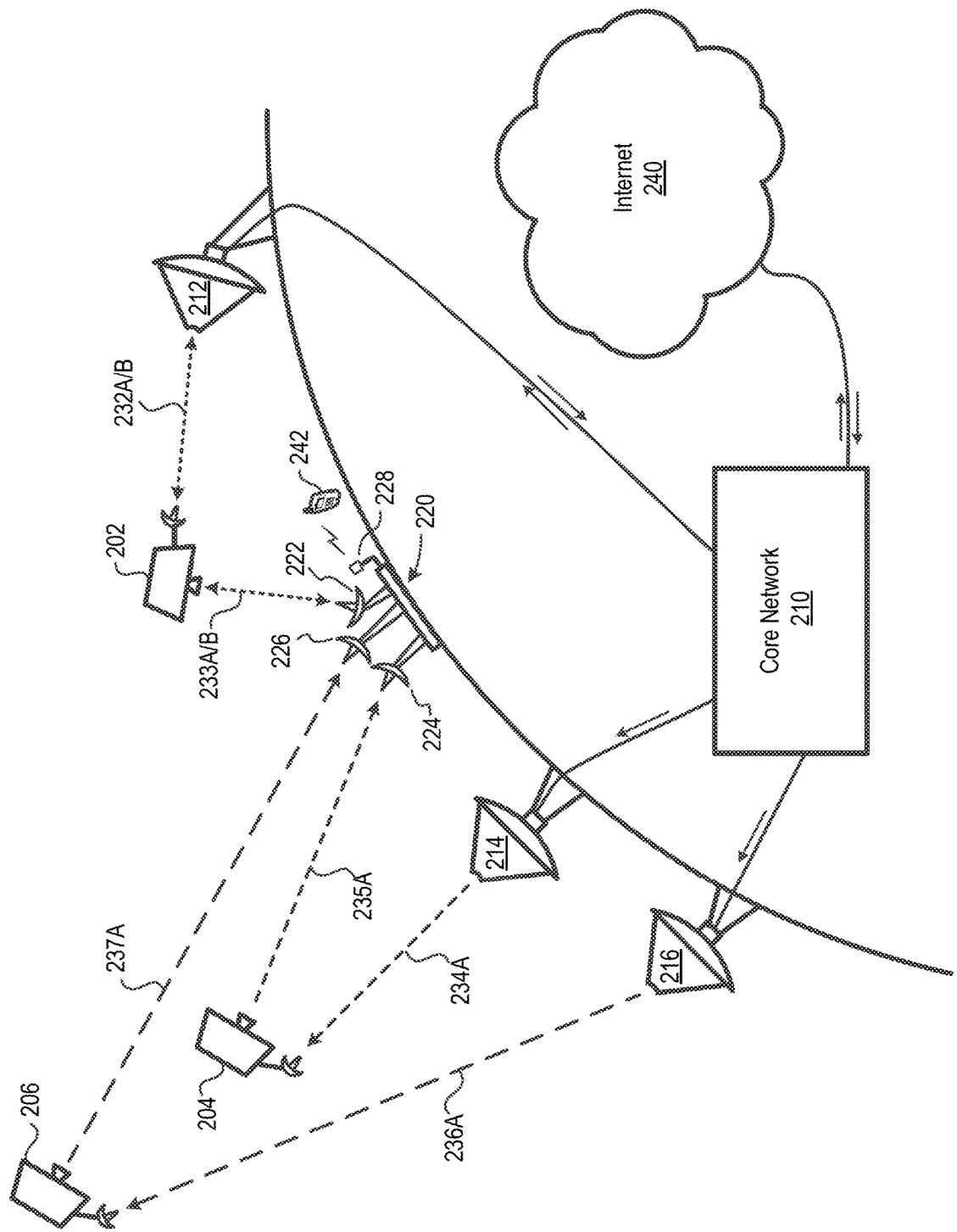
FIG. 2 depicts a combined LEO, MEO, and GEO system in accordance with the illustrative embodiment of the present invention.

FIG. 2 depicts a combined LEO, MEO, and GEO satellite system 200 in accordance with the illustrative embodiment of the present invention.

Satellite system 200 includes core network 210, ground-station gateway antennas (i.e., LEO gateway antenna(s) 212, MEO gateway antenna(s) 214, GEO gateway antenna(s) 216), LEO satellite(s) 202, MEO satellite(s) 204, GEO satellite(s) 206, and user terminal(s) 220. Also depicted, but not part of system 200, are user/user device 242 and Internet 240. It is to be understood that, for clarity of illustration, only one of each of the elements of system 200 are depicted in FIG. 2. In a functioning system, there will be many instances of each such element in system 200. This applies not only to the satellites (which, at least in the case of the LEO satellites, can number into the hundreds to over a thousand), but also to ground stations (e.g., the gateway antennas, etc.) and especially to user terminals, etc.

Core network 210 provides a variety of functions in network 200 including, to mention a few, switching, routing, control and authentication. As is relevant here, core network 210 receives data from and transmits it to Internet 240. With respect to the data received from Internet 240, core network routes data packets to the various satellites (e.g., LEO, MEO, GEO, etc.) in accordance with a routing logic. For example, data may be routed to LEO gateway 212 for transmission, via communications link 232A, to LEO satellite 202. Core network 210 also routes data packets to MEO gateway 214 for transmission, via communications link 234A, to MEO satellite 204. And core network 210 routes data packets to GEO gateway 216 for transmission, via communications link 236A, to GEO satellite 206.

User terminal 220 is a user's interface to satellite system 200. In the case of residential users, for example, there is typically one user terminal 220 at the dwelling of each such residential user. In the illustrative embodiment, user terminal 220 comprises three antennas, including antennas 222, 224, and 226 for communicating with LEO, MEO and GEO satellites, respectively. Antenna 224 receives signals from MEO satellite(s) 204 via communications link 235A and antenna 226 receives signals from GEO satellite(s) 206 via communications link 237A.

Although antennas 224 and 226 may be capable of transmitting signals to respective MEO and GEO satellites, in the illustrative embodiment, they do not do so. That is, they are one-way satellites that participate in forward-link communications only. On the other hand, LEO satellite(s) 202 are two-way satellites, participating in both the forward and reverse link. Thus, antenna 222 receives signals from LEO satellite(s) 202 via communications link 233A and it also transmits to LEO satellite(s) 202 via communications link 233B. Transmissions received by satellite 202 from antenna 222 are transmitted to LEO gateway 212.

Transmissions from or to ground-based gateway antennas (e.g., MEO gateway antenna 214, etc.) are received by or transmitted from a gateway antenna on the satellite(s). Transmissions received by or transmitted from the antennas on user terminal 220 are transmitted from or received by user antennas on the satellite. (See FIG. 3).

The signals received at antennas 222, 224, and 226 of user terminal 220 are combined for transmission to user device 242 via interface 228.

In some embodiments, all satellites in system 200 (e.g., LEO, MEO, and GEO satellites) use the same downlink frequencies. This is possible, in some cases, because the angular separation between the various satellites, as seen by every user terminal 220, is sufficient to prevent interference. And by using scheduling and novel coding and modulation and orthogonality, the same frequencies may be re-used in a highly efficient manner without interference between the coordinated satellites.

The embodiment shown in FIG. 2 depicts a situation in user terminal 220 is in a location that is served by a satellite beam from each the three types of satellites. Thus, user 242 can utilize all three satellite types for accessing the Internet. As will be appreciated by those skilled in the art, user terminal 220 and its antennas 222, 224, and 226, are physically much smaller in size than gateway antennas 212, 214, and 216.

As previously noted, core network 210 determines where (i.e., to which type of satellite) to route each data packet in accordance with a routing logic. In the illustrative embodiment, that routing logic is based on "latency;" that is, the delay between an input and the desired output. In satellite communications system 200, LEO satellites have the lowest latency, GEO satellites have the greatest latency, and MEO satellites have a latency that is intermediate between that of LEO satellites and GEO satellites. This is due, primarily, to the distance of the various orbits to the Earth.

Low latency communications, for example, enables human-unnoticeable delays between an input being processed and the corresponding output, thereby providing real-time characteristics. This is particularly important for internet connections utilizing services such as Voice-over-Internet-Protocol (VoIP), video conferencing, trading, and online gaming. In the illustrative embodiment, the routing engine in core network 210 directs data packets pertaining to such services to LEO satellites 202.

At higher latency, delays are noticeable. For certain services, such as e-mail and peer-to-peer file transfers, high latency is typically not problematic. In the illustrative embodiment, the routing engine typically directs data packets pertaining to such services to GEO satellites 206 (or to MEO satellites 204). For some other services, such as chat room discussions, real-time characteristics are not typically required, but high latency is not desirable. In the illustrative embodiment, the routing engine typically directs data packets pertaining to such moderate-latency services to MEO satellites 204.

The traffic type (high, moderate, or low latency) for a given data packet can be determined, for example and without limitation, by reading its port number, by deep inspection of the packet contents itself, or by statistical analysis of packet arrival times, packet sizes, and byte frequencies.

As previously disclosed, a different routing logic (i.e., other than latency) can be used in conjunction with embodiments of the invention. Furthermore, in some embodiments, in addition to applying a routing logic to the forward link, routing logic is also applied to the reverse link. The routing logic need not be symmetric; that is, a different logic can be applied for the forward and reverse links.

Some alternative embodiments (not depicted) of the invention include a LEO constellation of satellites and:
  one or more GEO satellites or a constellation thereof (but not MEO or other non-LEO satellites);
  one or more MEO satellites or a constellation thereof (but not GEO or other non-LEO satellites);
  one or more GEO satellites/constellation and one or more other non-LEO satellites/constellations (but not MEO);
  one or more MEO satellites/constellation and one or more other non-LEO satellites/constellations (but not GEO);
  one or more GEO satellites/constellation and one or more MEO satellites/constellation and one or more other non-LEO satellites/constellation(s); and one or more other non-LEO satellites/constellation(s) (but not GEO or MEO satellites/constellations).

For the sake of brevity, the aforementioned alternative embodiments are not discussed in any further detail herein. However, in conjunction with the information provided in this disclosure, it is within the capabilities of those skilled in the art to adapt the illustrative embodiment to the alternative embodiments referenced above.

Figure 3:
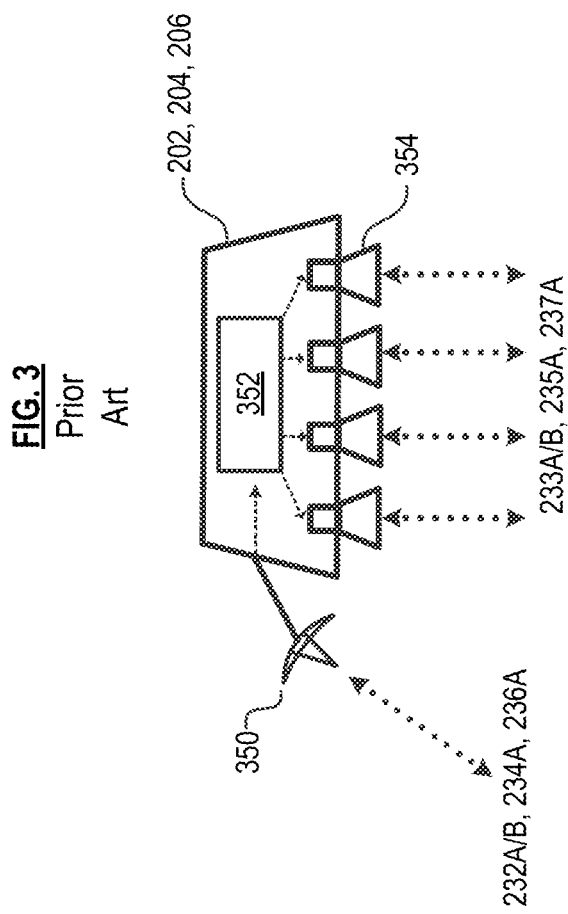
FIG. 3 depicts a conventional satellite and its communications payload.

FIG. 3 depicts a conventional LEO, MEO, or GEO satellite and its communications payload. Signals transmitted from a gateway antenna at a ground station are received by the satellite's gateway antenna 350 and directed to transponder 352.

As signals propagate through space, they lose strength and distort (known as "channel effects"). As such, the signals received at the satellite are approximations of the transmitted signals. Transponder 352 appropriately enhances and/or processes the received signals to counter the channel effects. The nature of the enhancement or processing can vary depending on transponder specifics.

In particular, the transponder may comprise transparent repeaters, also referred to as non-regenerative or "bent-pipe" repeaters, which simply amplify the received signals, filter out unwanted signals, and convert, as appropriate, between the uplink and the downlink frequencies. Alternatively, the transponder may comprise regenerative repeaters with processing capabilities, wherein the received signal is demodulated, decoded, re-encoded and re-modulated, basically regenerating the information contained in the signals.

Once the signals are appropriately enhanced/processed, they are directed to the satellite's "user antennas" 354, which transmit the signals, in the form of "user beams" or "satellite beams" to the user terminal. User beams are discussed in further detail later in this disclosure in conjunction with FIGS. 9A, 9B, and 10-12.

Figure 4:
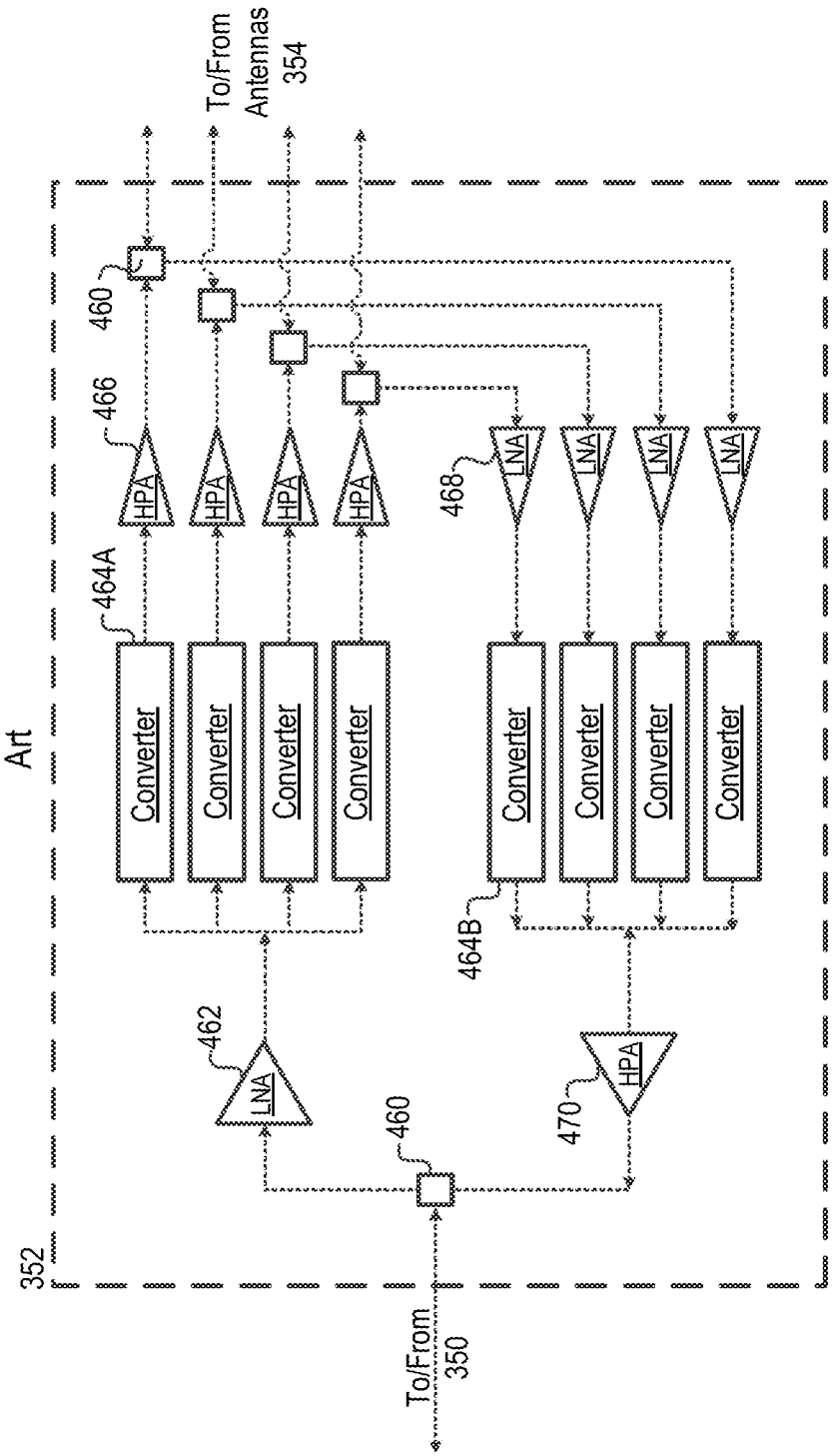
FIG. 4 depicts additional detail of the conventional communications payload of FIG. 3.

FIG. 4 depicts further detail of conventional transponder 352, suitable for use in conjunction with some embodiments of the invention. Transponder 352, which is embodied as a bent-pipe repeater, includes diplexers 460, low noise amplifiers 462 and 468, frequency down-converters 464A, frequency up-converters 464B, and high power amplifiers 466 and 470. An input band-pass filter, not depicted but typically included in transponder 352, is used to filter out unwanted signals.

Diplexer 460, which is passive device for implementing frequency-domain multiplexing, enables forward-link transmissions and reverse-link transmissions to share the same antenna. In particular, diplexer 460 that interfaces with the satellite's gateway antenna 350 directs: (a) the single $K_a$ band forward-link signal (from a ground-based gateway antenna) to LNA 462 and (b) directs the reverse-link signal (from user terminal 220) to gateway antenna 350 for downlink to a ground-based gateway antenna. Diplexers 460 that interface with user antennas 354 direct: (a) forward-link signals from HPAs 466 to antennas 354 for downlink to user terminal 220 and (b) direct the return-link signals (from user terminal 220) to LNAs 468.

An orthogonal mode transducer (OMT) can be used as an alternative to diplexer 460. The OMT, commonly referred to as a polarization duplexer, can combine or separate two orthogonally polarized microwave signal paths. Use of the OMT requires that the receive signal and the transmit signal have a different polarization state. For example, the transmit signal might be right-hand circularly polarized and the receive signal might be left-hand circularly polarized.

Addressing the forward link first, LNA 462 is a low noise amplifier for amplifying the weak RF signal received from a gateway antenna of a ground station. Once amplified, the received signal is split by an RF splitter (not depicted) into plural signals corresponding to the number of (user) antennas that transmit beams to users. Although FIG. 4 depicts four such signals, the number of signals will typically be greater. For example, for an LEO satellite, in various embodiments, there will typically be from 10 to 20 user antennas and, hence, an equal number of signals. For MEO or GEO satellites, the number might be larger. After splitting, the signals are fed to frequency down-converters 464A, which down convert the $K_a$ band signals to the appropriate RF carrier frequency (for each antenna beam) in the $K_u$ band for downlink.

The output signals from frequency down-converters 464A are typically filtered (not depicted) and then each signal is amplified in high power amplifiers 466. The amplified signals are then directed by diplexers 462 to user antennas 354 for downlink. Both polarization states can be used in the user downlink, thus doubling the use of each frequency channel.

Turning now to the reverse link, $K_u$ band signals received from user terminal 220 are directed by diplexers 460 to low noise amplifiers 468. These amplifiers amplify the very weak signals received from user terminal 220. The amplified signals are fed to frequency up-converters 464B, which up convert the signals to $K_a$ band. The signals from the up-converters are combined in an RF combiner (not depicted), and then amplified in high power amplifier 470. The combined, amplified signal is then directed by diplexer 460 to the satellite's gateway antenna 350 for transmission to the gateway antenna of a ground station. In this embodiment, the uplink frequency was assumed to be $K_u$ band; the uplink can be either $K_a$ band or $K_u$ band, dependent on factors such as regulatory limits, amplifier technology, and/or susceptibility to rain fade.

Figure 5:
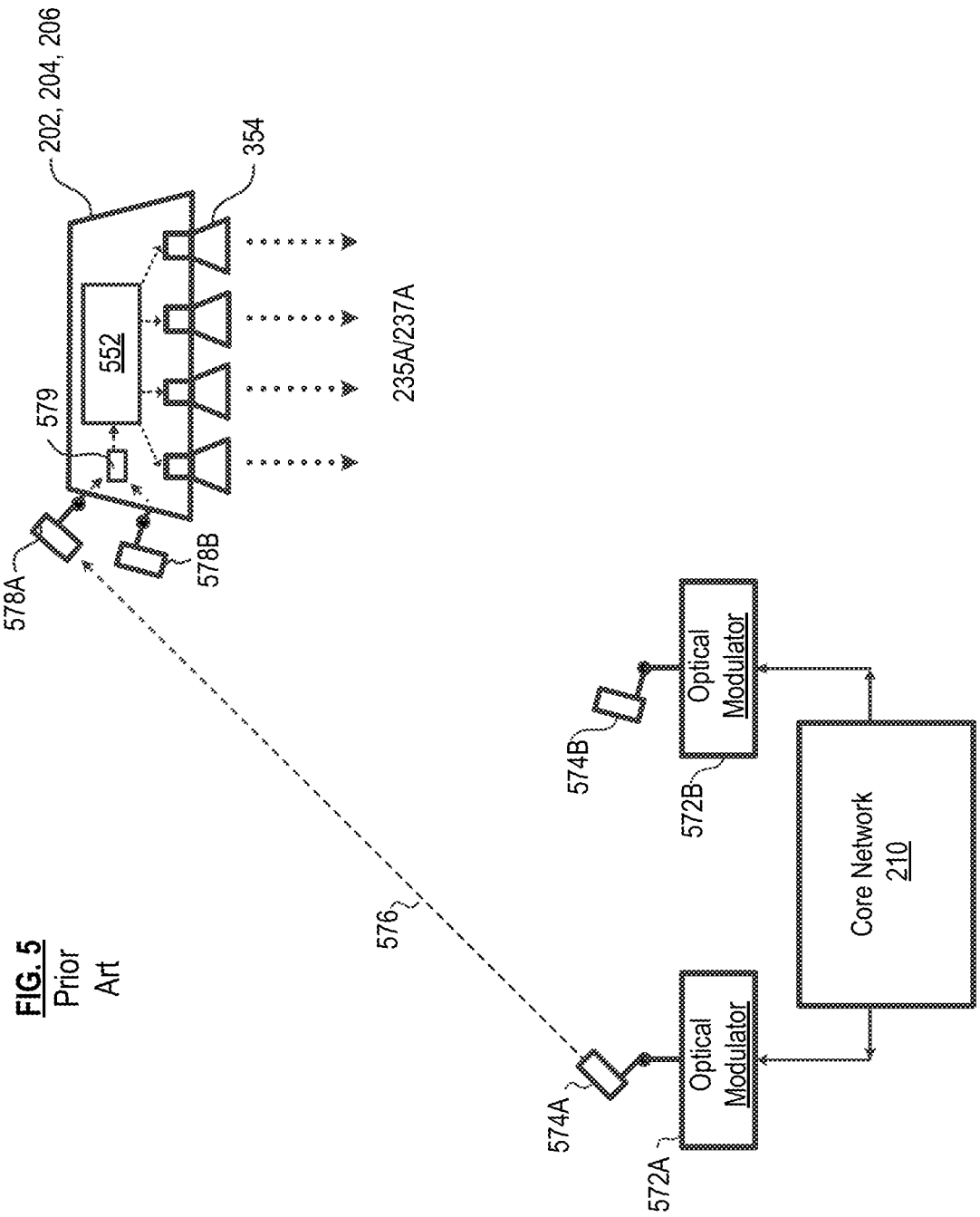
FIG. 5 depicts an alternative embodiment of a communications payload for forward link traffic.

FIG. 5 depicts a second embodiment of a communications payload for satellites for use in system 200. The payload and ground station elements depicted in FIG. 5 are for the forward link only. This arrangement is suitable, for example, for MEO and GEO satellites in embodiments in which those satellites handle forward-link traffic only.

In the embodiment depicted in FIG. 5, the uplink to the satellite is performed via free-space optical links (i.e., laser communications). This enables the transmission of a massive amount of data to the satellite.

Data packets from core network 210 are converted from the electrical domain to the optical domain via optical modulator 572A and transmitted via beam 576 from laser 574A to optical receiver 578A on the satellite. The optical receiver consists of a telescope that collects some of the laser light and focuses it onto a high-speed detector, which outputs an electrical signal. The ground station includes additional optical modulator(s) 572B and laser(s) 574B and the satellite includes second optical receiver 578B. The additional equipment provides robustness to adverse weather on the ground, without any outages. Only one optical head on the satellite is active at any time, with the other head pointing at the next best ground site, ready to take over if the primary site is blocked by clouds, fog, etc. Switch 579 is used on the satellite to switch between optical receivers 578A and 578B. The electrical-domain signal from switch 579 is direct to transponder 552.

Figure 6:
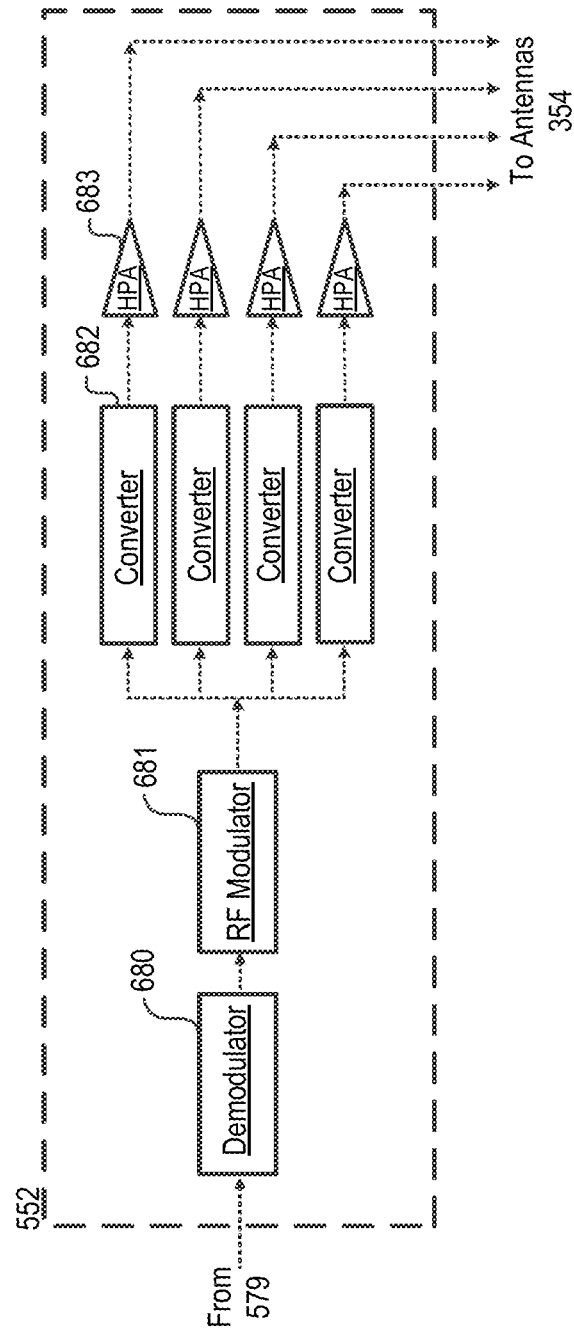
FIG. 6 depicts additional detail of the communications payload of FIG. 5.

FIG. 6 depicts transponder 552, which, among other components, includes demodulator 680, a splitter (not depicted), RF modulator 681, frequency converters 682, and high power amplifiers 683.

The electrical domain signal from optical receiver 578A/B, after switching, is demodulated at demodulator 680. A processor, not depicted, extracts information from the demodulated signals indicating which antenna beam the signal is intended for, the signals are modulated in RF modulator 681, and the signals are split into separate channels via a splitter (not depicted) for conversion, in converters 682, to the particular RF carrier frequency for each antenna beam. The frequency-adjusted signals are then directed to the appropriate antenna 354 for transmission to the user station.

Figure 7:
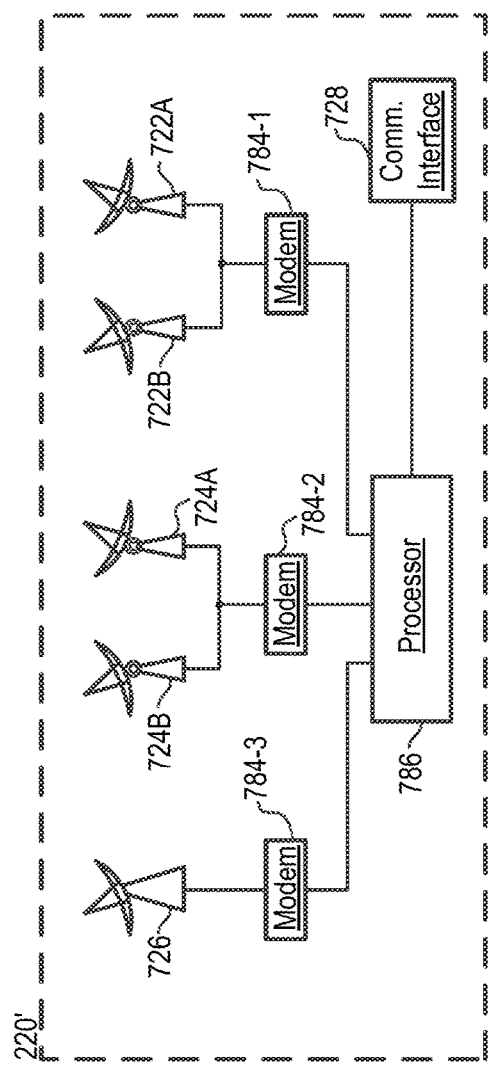
FIG. 7 depicts a first embodiment of a user terminal for use in the system of FIG. 2.

FIG. 7 depicts a first embodiment 220' of user terminal 220 depicted in FIG. 2. User terminal 220' includes active LEO antenna 722A that tracks an LEO satellite and optional swing-back LEO antenna 722B. The purpose of the swing-back antenna is to wait idly while antenna 722A tracks a LEO satellite until it travels out of view. Once antenna 722A losses the LEO satellite it was tracking, swing-back antenna 722B picks up the next LEO satellite, at which point antenna 722A becomes idle. User terminal 220' also includes active MEO antenna 724A that tracks and MEO satellite and optional swing-back MEO antenna 724B. These antennas operate in the manner of antennas 722A/B. The user terminal further includes GEO antenna 726, which requires neither tracking nor swing back.

Each antenna (or pair of antennas) connects to a modem (i.e., modems 784-1, 784-2, and 784-3). The modems connect to processor 786 where, with respect to downlink, the information received at the various antennas is merged and then transmitted to users via any one of several possible interfaces devices 728 supporting various communications protocols (e.g., Ethernet, WiFi, LTE, etc.).

In user terminal 220', the signals from an antenna and its swing-back partner are merged before they are fed to a modem, such as via an analog switch. Alternatively, the data from each antenna can be converted from analog to digital prior to the modem, and switching is performed in the digital domain.

In the illustrative embodiment, only the LEO antennas 722A/B transmit. Thus, a signal from a user, relayed via communications interface 728, is processed in processor 786 and directed to modem 784-1.

Figure 8:
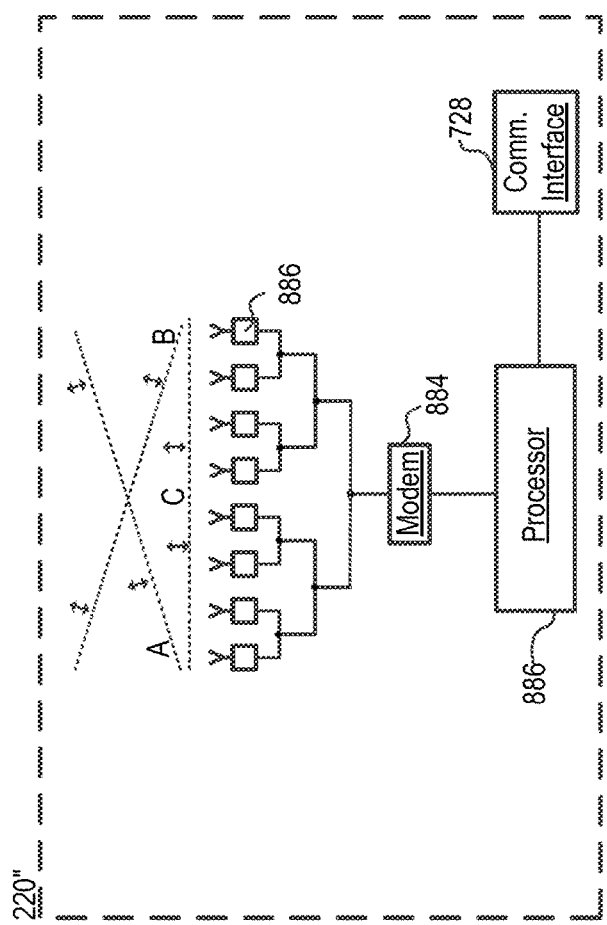
FIG. 8 depicts a second embodiment of a user terminal for use in the system of FIG. 2.

FIG. 8 depicts a second embodiment 220" of user terminal 220 of FIG. 2. User terminal 220" incorporates an active, electronically steerable array antenna, commonly used in radar and communications. The antenna is capable of receiving or generating wavefronts A, B, and C, which propagate in different directions in space for communications with a LEO, MEO, or GEO satellite.

Active elements within each antenna element 886 make this possible by serving to amplify the signals in either direction and also by applying a variable amount to phase delay in order to create wavefonts inclined at various angles.

The signals then are received by or transmitted from modem 884, which is connected to processor 886. Communications to and from a user is via interface 728, as discussed in conjunction with FIG. 7.

An advantage of user terminal 220" is the mechanical simplicity (e.g., no motors, etc.), as well as the ability to steer the beam from side-to-side in a matter of microseconds (c.a. 10 microseconds). This enables a single antenna array to seamlessly switch from one satellite to another in the same constellation or between constellations.

Figure 9B:
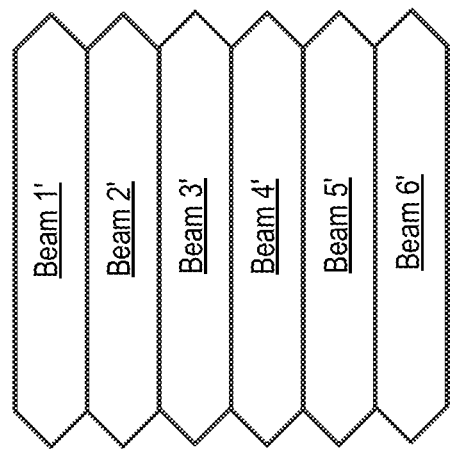
FIG. 9B depicts a second pattern for satellite beams.
Figure 9A:
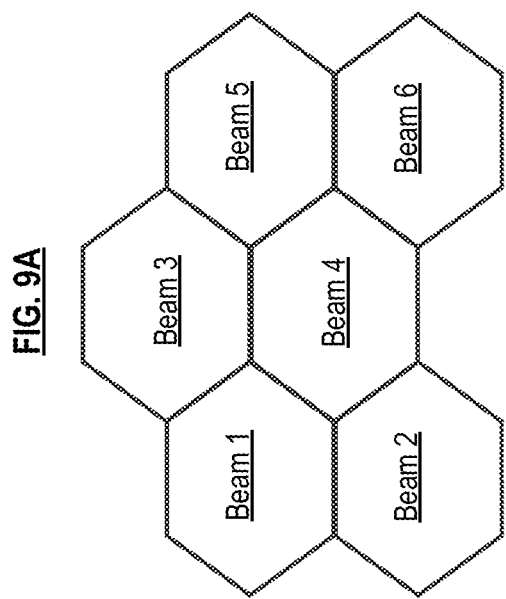
FIG. 9A depicts a first pattern for satellite beams.

FIGS. 9A and 9B depict two different user beam patterns, with six beams each. FIG. 9A depicts traditional "circular" beams 1 through 6 (shown as hexagonal) arranged in a "cellular" pattern and FIG. 9B depicts a "Venetian blind" user-beam pattern. In the Venetian pattern, beams 1' through 6' have a more elliptical or elongated shape than beams 1 through 6, but provide the same coverage area and same peak power as circular beams. Note that both layouts have the same number of beams and cover the same area. Therefore, the antenna aperture area is the same, and to first order, the payload mass and volume are the same.

The elongated shape of the Venetian pattern enables an ability to shift capacity laterally in the east-west direction, which circular-cell beam patterns cannot do (assuming payloads of equal mass and volume). Capacity is shifted by scheduling the packets to preferentially route to user terminals in a particular geographic region within the beam. This enables the system to adapt to changing diurnal traffic patterns that shift over times zones, as depicted in FIG. 10. Radio waves still land, of course, everywhere in the beam. But the information encoded in the radio waves can be directed by core network 210 to any part where there are users or demand is greatest.

In some embodiments, as depicted in FIG. 11, MEO and/or GEO satellites include multiple communication payload modules, including two sets of user antennas 354' and 354". This enables the same satellite to direct user beams to separated parts of the Earth, for example that have high utilization.

In yet some further embodiments, the beam patterns from plural MEO or GEO satellites having plural communications payloads (e.g., FIG. 11) are interspersed and the same downlink RF frequencies are reused. The beams patterns from separate MEO or GEO satellites can be positioned side-by-side (e.g., one satellite covers the Western U.S. and the other satellite covers the Eastern U.S.) without interfering with each other because of the angular separation between the satellites, as seen from the ground.

The results of a rudimentary link budget analysis is shown below to demonstrate some of the design aspects of a GEO satellite for an embodiment wherein one or more GEO satellites are used in conjunction with a constellation of LEO satellites.

Optical Uplink:
Wavelength=1550 nm
Output power=5.6 W
Transmit aperture=50 cm
Receive aperture=10 cm
Data rate: 100 Gbps
RF downlink:
Frequency=11.7 GHz
Transmit output RF power=80 Watts per 250 MHz channel
Number of channels per beam=4
Number of beams=64
Transmit aperture=5.3 meter×0.33 meter (Venetian blind)
Receive G/T=9 dB/K (about 35 cm diameter)
Spectral efficiency about 1.5 bps/Hz
Beam footprint on ground=3700 km×230 km (Venetian blind)

Figure 12:
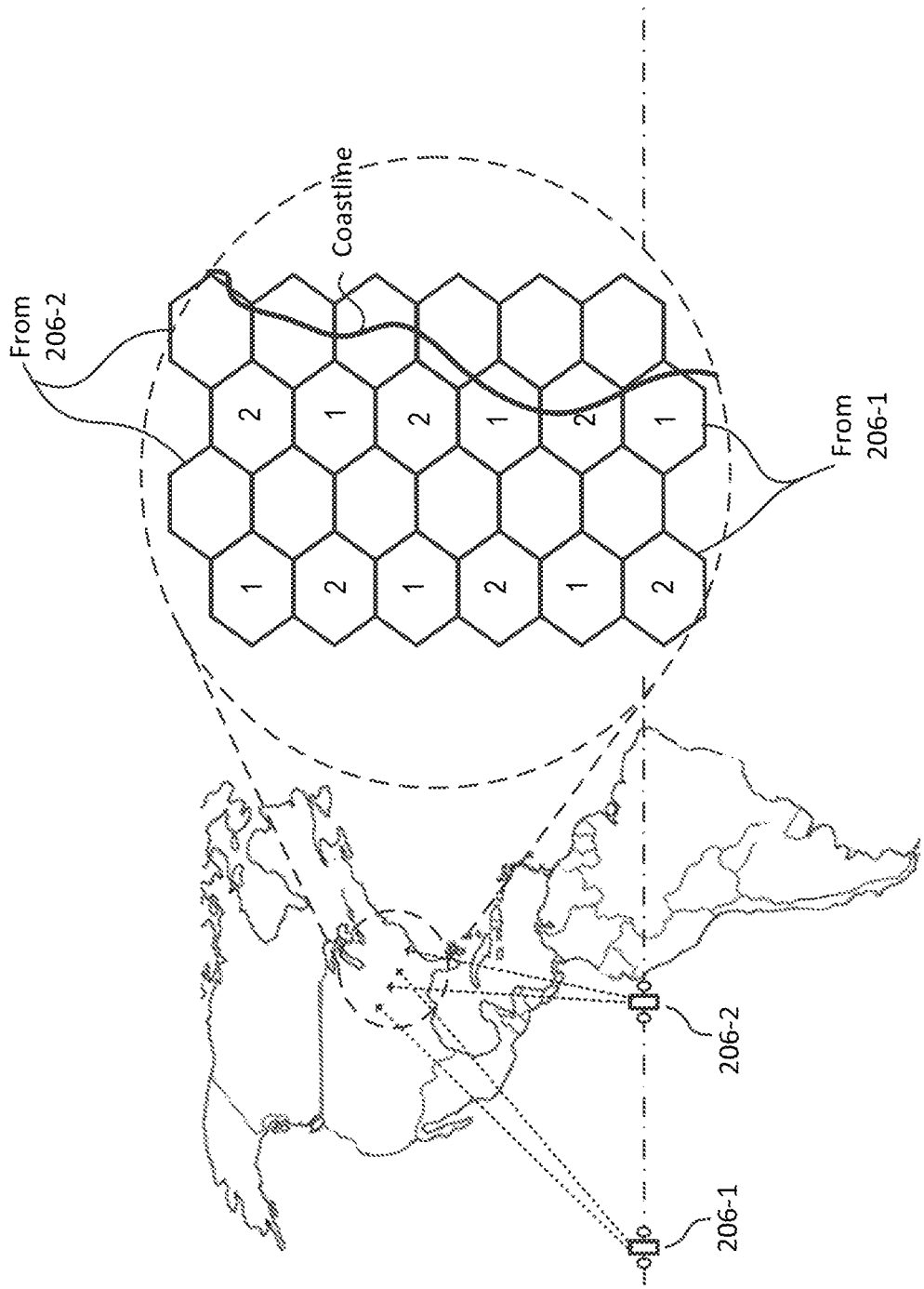
FIG. 12 depicts the use of more than one GEO satellite, wherein beam patterns are interspersed and same downlink RF frequencies are reused.

FIG. 12 depicts an embodiment of a GEO satellite configuration with an even larger user antenna. In this embodiment, the beams are once again circular (with hex packing), but the beams from satellites 206-1 and 206-2 only form into North-South columns, with no two columns touching. The beam spots can be arranged, for example, to follow coastlines, where most of the world's population resides. This highlights another advantage of the so-called "Venetian blind" pattern, which, as applied here, is more of a "centipede" pattern.

This approach enables each channel "1" and "2" in the limited $K_u$ spectrum to be reused a maximal number of times (2-color reuse as opposed to the 3-color reuse in hex-packing beams).

As depicted in FIG. 12, the inclusion of additional GEO satellites to fill in the gaps between columns of other satellites enables entire land-masses to be covered. Some overlap between the beams from different satellites is allowable and in fact, creates zones of persistent double-coverage. This enables more subscribers to be supported in these zones.

An exemplary set of design parameters for a GEO satellite in the arrangement described above is:
Optical Uplink:
Wavelength=1550 nm
Output power=25 W
Transmit aperture=50 cm
Receive aperture=10 cm
Data rate: 200 Gbps
RF downlink:
Frequency=11.7 GHz
Transmit output RF power=0.5 Watts per 250 MHz channel
Number of channels per beam=4 (use of both polarizations "doubles" this)
Number of beams=64
Transmit aperture=20 meter×20 meter ("centipede" blind)
Receive G/T=9 dB/K (about 35 cm diameter)
Spectral efficiency about 1.5 bps/Hz
Beam footprint on ground=70 km×70 km ("centipede" blind)

One obstacle to having joint operation of the inclined-MEO constellation with the LEO constellation is mutual interference when both constellations use the same user frequencies. To alleviate this problem, it is necessary to achieve a large enough population in MEO such that a diversity of MEO satellites are always available for selection by a user.

Mutual interference only occurs between LEO and MEO if a satellite from each constellation uses the same frequency while also being within a certain angular distance as seen from the ground. For a typical user terminal having an antenna less than 1-meter diameter operating in the $K_u$ band, this mutual keep-out distance is about 10 degrees.

Figure 13:
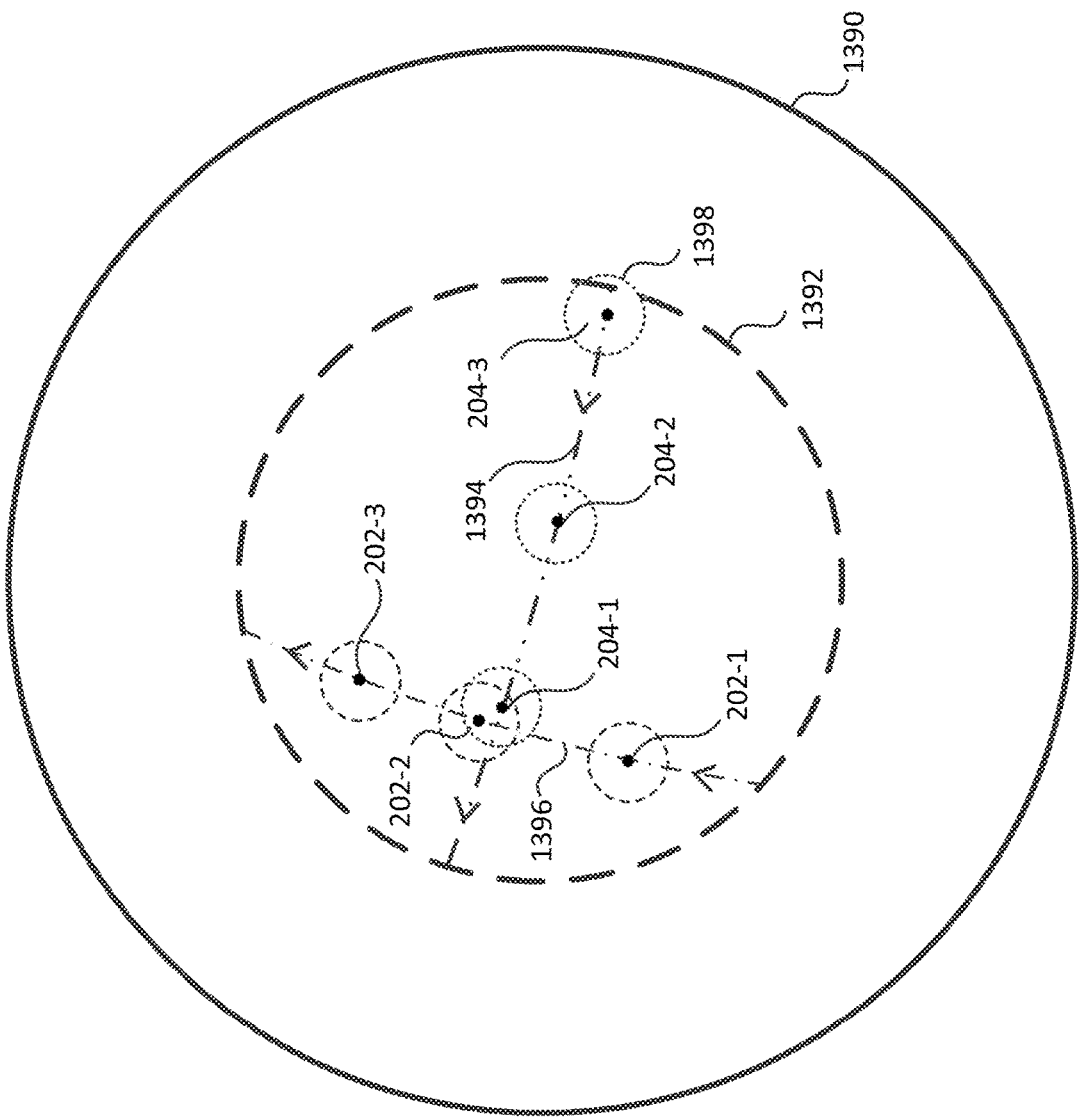
FIG. 13 depicts a view looking up at the sky, as seen from a user terminal of the system of FIG. 2.

FIG. 13 depicts a view of the sky, looking up, from the perspective of a user terminal. The view of the sky is bounded by the Earth's horizon 1390. The center is looking straight up at the sky (zenith). The space of all possible look angles is called the user terminal's "field of regard" 1392. In the field of regard, LEO satellites 202-1, 202-2, and 202-3 trace a path from bottom to top. Three MEO satellites 204-1, 204-2, and 204-3 are shown tracing a path from right to left. In general, the paths drift across the sky, and neither the LEOs nor MEOs retrace the same path until a day or more has passed.

Each satellite is characterized by a "keep-out zone," which is depicted as small dotted circles (MEO satellites) and small dashed circles (LEO satellites) surrounding each satellite (see, e.g., keep out zone 1398 of satellite 204-3). In the example depicted in FIG. 13, LEO satellite 202-2 and MEO satellite 204-1 are inside each other's mutual keep-out zones.

During the interval when satellites 202-2 and 204-1 are within each other's mutual keep-out zones, one of those satellites, typically the MEO satellite (in this case, satellite 204-1) would have to shut off its user beam or direct it at another ground location. In such a situation, the user terminal can choose to link with LEO satellite 202-2 and MEO satellites 804-2 or 804-3. Or, if LEO satellite 202-2 shuts down its beam or redirects it, then the user terminal can link with LEO satellites 202-1 or 202-3 and any of MEO satellites 804-1, 804-2, or 804-3.

FIG. 14 depicts method 1400 in accordance with the illustrative embodiment of the present invention. In accordance with task T1401 of method 1400, a data packet is received at a core network of a satellite system, such as system 200. The data packet is typically received from the Internet. At task T1402, the data packet is routed to either a LEO satellite or a non-LEO satellite in accordance with routing logic.

As previously discussed, a variety of routing logic can be used in conjunction with embodiments of the invention. FIG. 15 depicts sub-tasks of task T1402 for an embodiment in which the routing logic is based on the latency. In subtask T1501, the latency associated with the data packet is determined. As previously discussed, the latency associated with a packet can be determined, for example, reading its port number, by deep inspection of the packet contents itself, or by statistical analysis of packet arrival times, packet sizes, and byte frequencies.

In subtask T1502, query whether latency is critical. If it is, then route the data packet to an LEO satellite in accordance with subtask T1503. If latency is not critical, then query, at subtask T1504 whether more than one type of non-LEO satellite is available. If not, then route the data packet to the non-LEO satellite in accordance with subtask T1505. If yes, then route the data packet to the non-LEO satellite that is most appropriate in view of the latency of the data packet, per subtask T1506. For example, if the data packet was data pertaining to a chat room, the latency would be considered "medium" and if a satellite providing lower latency than a GEO satellite, such as a MEO satellite is part of the system, then the data packet is preferentially routed to the MEO satellite.

It is to be understood that the disclosure describes a few embodiments and that many variations of the invention can easily be devised by those skilled in the art after reading this disclosure and that the scope of the present invention is to be determined by the following claims.

What is claimed is:

1. A method for routing, to a user device via a ground station, a first data packet of a plurality of data packets in a satellite system, the satellite system including a plurality of satellites, at least a first of which satellites is in low Earth orbit (LEO), and remaining satellites include at least one satellite in medium Earth orbit (MEO) and at least a first and a second of which satellites are in geocentric orbit (GEO), wherein the first satellite in GEO and the second satellite in GEO provide coverage to a land mass based on a north-south centipede coverage pattern, wherein a north-south column of the north-south centipede pattern including hexagonal beams is arranged with a frequency reuse value of two, the method comprising:
   determining a latency of the first data packet by at least one of port number and statistical analysis of the plurality of data packets, and:
   if the latency is characterized as critical, routing the first data packet to the first satellite;
   if the latency of the first data packet is characterized as medium, routing the first data packet to the satellite in MEO; and
   if the latency of the first data packet is characterized as high:

determining a first geographic location of the ground station, and routing, based on the first geographic location, the first data packet to the first satellite in GEO or the second satellite in GEO.

2. The method of claim 1, and further comprising routing the first data packet from the first satellite, the second satellite, or the third satellite to the user device.

3. The method of claim 1, and further comprising routing the first data packet from the first satellite, the second satellite, or the third satellite to a core network of the satellite system.

4. The method of claim 2, and further comprising routing, in accordance with a routing logic that is not based on latency, a second data packet from the user device to one of the first satellite, the second satellite, or the third satellite.

5. The method of claim 2, and further comprising routing, in accordance with a routing logic that is not based on latency, a second data packet from a core network of the satellite system to one of the first satellite, the second satellite, or the third satellite.

6. The method of claim 2, wherein said statistical analysis comprises an analysis of one or more of packet arrival times, packet sizes, and byte frequencies.

\* \* \* \* \*